S. LIBERTO.
ATTACHMENT FOR COFFEE ROASTERS.
APPLICATION FILED JULY 28, 1916.
1,251,392.
Patented Dec. 25, 1917.
2 SHEETS—SHEET 1.
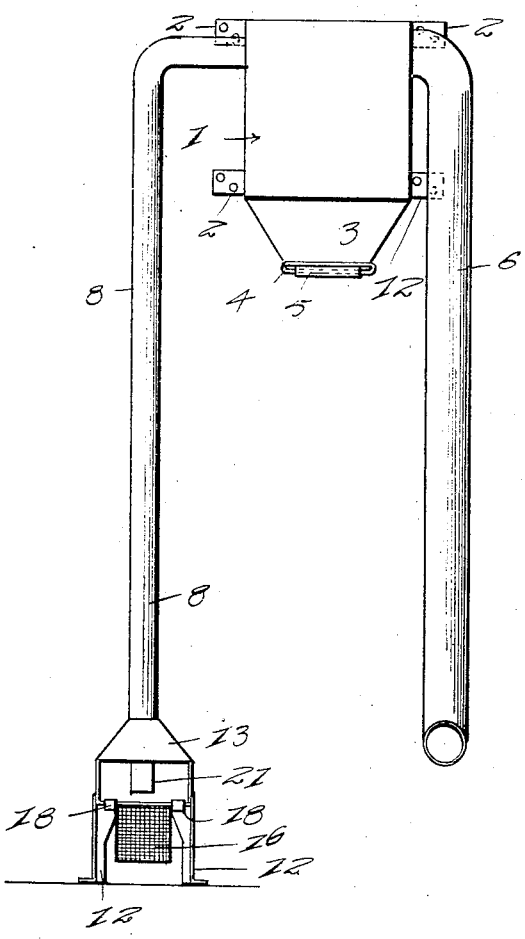
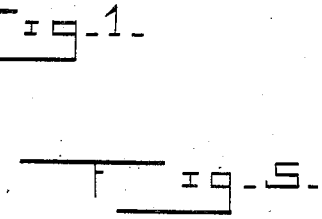
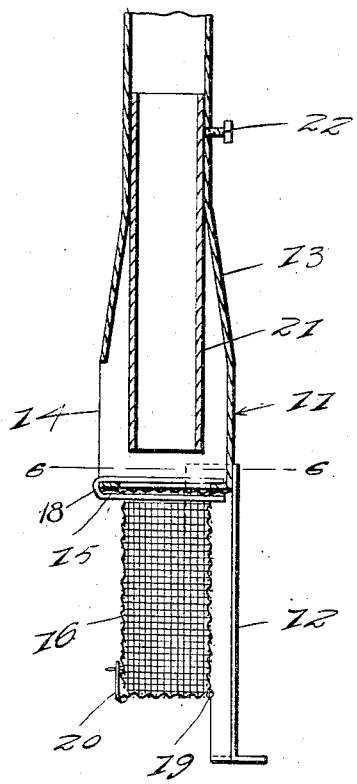
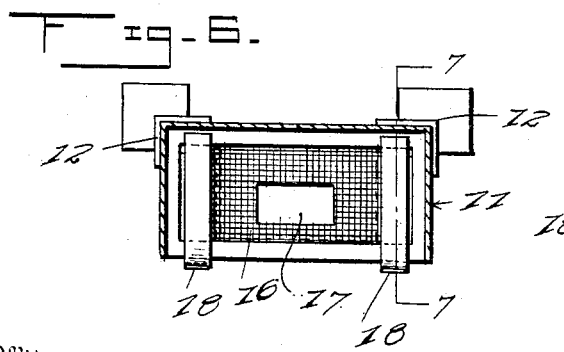
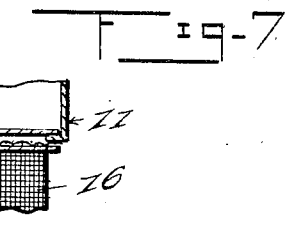
Witness
C. R. Beall.
W. F. Davidson.
Inventor
S. Liberto.
By [signature]
Attorney

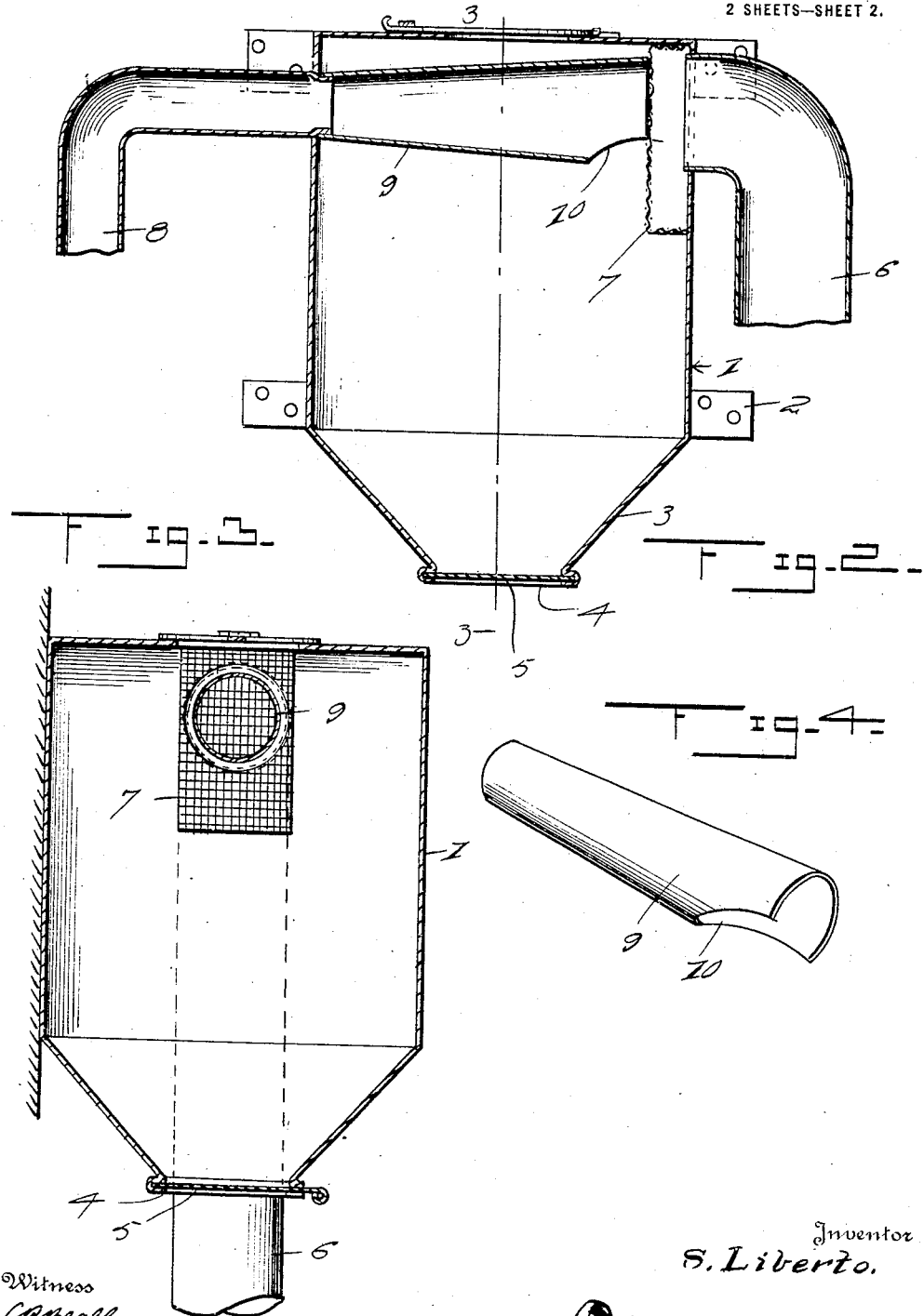

UNITED STATES PATENT OFFICE.

SAMUEL LIBERTO, OF SAN ANTONIO, TEXAS.

ATTACHMENT FOR COFFEE-ROASTERS.

1,251,392.  Specification of Letters Patent.  Patented Dec. 25, 1917.

Application filed July 28, 1916. Serial No. 111,857.

*To all whom it may concern:*

Be it known that I, SAMUEL LIBERTO, a citizen of the United States, residing at San Antonio, in the county of Bexar and State of Texas, have invented certain new and useful Improvements in Attachments for Coffee-Roasters; and I do hereby declare the following to be a full, clear, and exact description of the invention, such as will enable others skilled in the art to which it appertains to make and use the same.

This invention relates to an attachment for coffee roasting machines and has for its primary object the provision of means for separating coffee from foreign matter after the coffee has been roasted and removed from the coffee roasting machine and which is capable of being readily and quickly applied to coffee roasting machines now upon the market.

Another object of this invention is to provide a storage hopper having a suction pipe connected thereto and to a suction fan of a coffee roasting machine and an inlet pipe connected to the hopper and to a receiving hopper for receiving the coffee after being removed from the coffee roasting machine, whereby the coffee will be drawn into the storage hopper and deposited therein, while foreign matter of lighter weight than the coffee will pass into the suction pipe, leaving the coffee clean and ready to be placed within the grinding mill, thereby obviating the danger of clogging the grinding mill with dirt and injuring the grinding teeth thereof.

A further object of this invention is to provide a wire cage on the receiving hopper and located directly below the inlet pipe, so that when coffee containing foreign matter is placed within the receiving hopper, the coffee and foreign matter of lighter weight than the coffee will be drawn into the inlet pipe and the foreign matter of heavier weight than the coffee will fall into the wire cage and be collected therein.

A further object of this invention is to provide means mounted within the receiving hopper and inlet pipe so that the suction power of the inlet pipe may be regulated to prevent foreign matter of heavier weight than the coffee from being drawn into the inlet pipe when there is a high draft and also preventing, when there is a low draft, of the coffee not being drawn into the inlet pipe.

A still further object of this invention is the provision of an attachment for coffee roasters of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a front elevation of an attachment for coffee roasters, constructed in accordance with my invention, Fig. 2 is a fragmentary vertical sectional view of the storage hopper, Fig. 3 is a sectional view taken on the line 3—3 of Fig. 2, Fig. 4 is a detail perspective view of a pipe located within the storage hopper for allowing the coffee to enter the storage hopper, Fig. 5 is a vertical sectional view of the receiving hopper, Fig. 6 is a longitudinal sectional view taken on the line 6—6 of Fig. 5, and Fig. 7 is a detail sectional view illustrating the means of detachably securing the wire cage to the receiving hopper.

Referring in detail to the drawings, the numeral 1 indicates as an entirety a storage hopper having secured to the rear wall thereof brackets 2 for attaching the storage hopper to the wall of a building. The lower end of the hopper 1 is reduced as illustrated at 3 and has an opening or outlet port 4 which is closed by a sliding door 5, so that the contents of the hopper may be removed therefrom when desired.

A suction pipe 6 is secured to the upper end of the hopper 1 and is connected in any suitable manner with a suction fan of a coffee roasting machine (not shown). A wire cage 7 is secured within the hopper 1 and overlying the end of the suction pipe 6 as clearly illustrated in Fig. 3, for a purpose which will be hereinafter more fully described.

An inlet pipe 8 is secured to the hopper 1 at a point opposite the suction pipe 6 and has mounted thereon and positioned within the hopper 1 a pipe 9 which increases in dimension toward its free end and abuts the wire cage 7. The lower wall adjacent the wire cage 7 of the pipe 9 is cut away to form an opening 10 for allowing coffee drawn up through the pipe 8 to pass into the hopper by way of the pipe 9 and the opening 10 under the influence of the suction fan of the coffee roasting machine.

A receiving hopper 11 is mounted upon a pair of legs 12 which are bolted or otherwise secured to the flooring of the building and the receiving hopper 11 has its upper portion restricted as illustrated at 13 to receive or to be connected to the inlet pipe 8. The front wall of the receiving hopper 11 is cut away to form a doorway 14. The lower end of the receiving hopper 11 has an inwardly directed rectangular flange 15 for supporting a wire cage or receptacle 16 constructed from wire mesh or the like and has an opening 17 in the top thereof. The wire cage or receptacle 16 is secured to the rectangular flange 15 by substantially U-shaped members 18 as clearly illustrated in Fig. 7. The lower wall of the wire cage 16 or receptacle is hinged as illustrated at 19 and has its opposite edge supported in engagement with the side walls of the receptacle or wire cage 16 by a catch 20, whereby foreign matter falling within the wire cage or receptacle 16 may be removed therefrom when desired, and which will be hereinafter more fully described.

After the coffee has been roasted within the coffee roasting machine, the coffee is thrown within the receiving hopper 11 upon the top of the wire cage or receptacle 16 by way of the doorway 14 and the suction from the suction pipe 6 through the inlet pipe 8 will draw the coffee upwardly through the inlet pipe 8 into the pipe 9 against the wire cage 7 which will deflect the coffee downwardly within the storage hopper 1, allowing all foreign matter, such as dirt and chaff from the coffee and which is of lighter weight than the coffee to pass through the wire cage 7 into the suction pipe 6, thus thoroughly cleaning the coffee making it in a condition ready to be placed within the coffee mill to be ground, obviating the danger of dirt and other foreign matter from entering with the coffee into the grinding mill which would clog or otherwise injure the cutting or grinding teeth of the mill. All foreign matter of greater weight than the coffee will be left upon the top of the wire cage or receptacle 16 and moved upon same by the suction until the foreign matter of heavier weight than the coffee falls through the opening 17 into the wire cage or receptacle 16, thus preventing foreign material of heavier weight than the coffee from passing upwardly through the intake pipe 8 into the hopper 1.

A pipe 21 is slidably mounted within the receiving hopper 11 and held at various adjusted positions by means of a set screw 22, whereby the suction power may be regulated according to the draft caused by the suction fan to prevent a high draft from sucking up foreign matter of greater weight than the coffee and also insuring elevation of the coffee when there is a low draft from the suction fan. When there is a high draft within the inlet pipe 8 from the suction pipe 6, the pipe 21 is raised upwardly to allow a greater space between the lower end of the pipe and the top of the wire cage or receptacle 16 to prevent foreign matter of greater weight than the coffee to be drawn up into the inlet pipe 8 and when the draft within the suction pipe and the inlet pipe 8 is low, the pipe 21 is lowered in the direction of the top wall of the wire cage or receptacle 16 so that the elevation of the coffee and foreign matter of lighter weight than the coffee will be insured.

From the foregoing description taken in connection with the accompanying drawings, it will be noted that the foregoing description refers to a device which is capable of being readily installed and applied to coffee roasting machines now upon the market by simply attaching the suction pipe 6 to the suction fan of the coffee roasting machine and as fast as the coffee has been roasted within the roasting machine, it may be placed upon the top of the wire cage or receptacle 16 and be drawn into the storage hopper 1 by way of the inlet pipe 8 and pipe 9 against the wire cage 7 and be deflected downwardly therein. The coffee within the storage receptacle may be readily removed by opening the sliding door 5 and thence conveyed to the grinding machine in any suitable manner, thus obviating the danger of any dirt or other foreign matter from entering the grinding machine with the coffee.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A device of the character set forth comprising a coffee receiving hopper, an air suction pipe connected to the coffee receiving hopper, said coffee receiving hopper having its lower end open and a doorway in the side thereof, a substantially rectangular flange formed on the lower end of the coffee receiving hopper, a wire cage abutting the flange, and substantially U-shaped members securing the wire cage to the flange, said wire cage having an opening in the top thereof for allowing foreign matter larger than coffee to enter the cage.

2. A receiving hopper comprising a casing having a door way, said casing having its lower end open, a rectangular flange formed upon the lower open end of the casing, an air suction pipe connected to the casing, and a foraminous cage removably secured to the rectangular flange and having an opening in its top wall.

In testimony whereof I affix my signature in presence of two witnesses.

SAMUEL LIBERTO.

Witnesses.
B. L. BRIDGMAN,
M. WITMER.

Copies of this patent may be obtained for five cents each, by addressing the "Commissioner of Patents, Washington, D. C."